(12) United States Patent
Narasayya et al.

(10) Patent No.: US 7,580,941 B2
(45) Date of Patent: Aug. 25, 2009

(54) AUTOMATED LOGICAL DATABASE DESIGN TUNING

(75) Inventors: Vivek R. Narasayya, Redmond, WA (US); Sanjay Agrawal, Sammamish, WA (US); Anish Das Sarma, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/423,924

(22) Filed: Jun. 13, 2006

(65) Prior Publication Data

US 2007/0288495 A1 Dec. 13, 2007

(51) Int. Cl.
G06F 17/30 (2006.01)
(52) U.S. Cl. .................................................... 707/101
(58) Field of Classification Search ...................... 707/1, 707/2, 10, 100–102, 200, 3, 6
See application file for complete search history.

(56) References Cited

U.S. PATENT DOCUMENTS

| | | | |
|---|---|---|---|
| 5,485,610 A | 1/1996 | Gioielli et al. | |
| 5,852,818 A | 12/1998 | Guay et al. | |
| 5,937,402 A | 8/1999 | Pandit | |
| 6,560,595 B1 | 5/2003 | Sanders et al. | |
| 6,996,589 B1 | 2/2006 | Jayaram et al. | |
| 7,149,746 B2 * | 12/2006 | Fagin et al. | 707/102 |
| 7,228,312 B2 * | 6/2007 | Chaudhuri et al. | 707/102 |
| 7,277,940 B2 * | 10/2007 | Pauly et al. | 709/225 |
| 2003/0217069 A1 | 11/2003 | Fagin et al. | |
| 2004/0128296 A1 | 7/2004 | Krishnamurthy et al. | |
| 2004/0143581 A1 * | 7/2004 | Bohannon et al. | 707/100 |
| 2004/0177160 A1 | 9/2004 | Seto et al. | |
| 2005/0010566 A1 | 1/2005 | Cushing et al. | |
| 2005/0021287 A1 * | 1/2005 | Rjaibi | 702/180 |
| 2005/0102613 A1 | 5/2005 | Boukouvalas et al. | |
| 2005/0203933 A1 | 9/2005 | Chaudhuri et al. | |
| 2005/0251511 A1 * | 11/2005 | Shankar et al. | 707/3 |
| 2006/0031243 A1 | 2/2006 | Boyle et al. | |

FOREIGN PATENT DOCUMENTS

CA 2437008 2/2005

OTHER PUBLICATIONS

Jernej Kovse, et al. V-Grid—A Versioning Services Framework for the Grid. http://dbis.informatik.uni-kl.de/pubs/papers/KH03.WebDB.pdf, last accessed Apr. 12, 2006. 15 pages.

(Continued)

*Primary Examiner*—Mohammad Ali
*Assistant Examiner*—Marc R Filipczyk
(74) *Attorney, Agent, or Firm*—Turocy & Watson, LLP

(57) ABSTRACT

The subject disclosure pertains to logical schema tuning for databases. Mechanisms are provided for automatically recommending one or more logical schema transformations to improve database performance with respect to workload and data characteristics. Furthermore, several potential schema transformations including desirable properties are presented including mapping tables, vertical partitioning, frequent value elimination and type and attribute conversion. Still further yet, disclosed is a mechanism for rewriting database operations (e.g. queries, updates . . . ) for an optimized schema to ensure correct evaluation.

17 Claims, 14 Drawing Sheets

OTHER PUBLICATIONS

Martin Steeg. RADD/raddstar A Rule-based Database Schema Compiler, Evaluator, and Optimizer. PhD thesis, BTU Cottbus, Computer Science Institute, Cottbus. Oct. 20, 2000.

Guy M. Lohman, et al. SMART: Making DB2 (More) Autonomic. Proceedings of the 28th VLDB Conference, Hong Kong, China, 2002. 3 pages.

Leonidas Fegaras, et al. An Algebraic Framework for Physical OODB Design. 5th International Workshop on Database Programming Languages, Gubbio, Italy, 1995. 19 pages.

"Introducing CA Asset Management r11", 1 page, Accessible at http://www3.ca.com/, Last accessed on Jun. 19, 2006.

"Oracle-Peoplesoft", 1 page, Accessible at http://www.peoplesoft.com/, Last accessed on Jun. 19, 2006.

"Transaction Processing Performance Council", 2 pages, Accessible at http://www.tpc.org, Last accessed on Jun. 19, 2006.

R. Agrawal, et al. "Fast Algorithms for Mining Association Rules" In Proc. of VLDB, 1994. 13 pages.

S. Agrawal, et al. "Database Tuning Advisor for Microsoft SQL Server 2005", In Proc. of VLDB, 2004. 12 pages.

S. Agrawal, et al. "Automated Selection of Materialized Views and Indexes in SQL Databases", In Proc. of VLDB, 2000. 10 pages.

S. Agrawal, et al. "Integrating Vertical and Horizontal Partitioning into Automated Physical Database Design", In Proc. of ACM SIGMOD, 2004. 12 pages.

S. Chaudhuri, et al. "Storing XML (With XSD) In SQL Databases: Interplay of Logical and Physical Designs", In Proc. of ICDE, 2004. 1 page.

S. Chaudhuri, et al. "Index Selection for Databases: A Hardness Study and A Principled Heuristic Solution", IEEE Trans. Knowl. Data Eng., 16(11), 2004. 11 pages.

S. Chaudhuri, et al. "An Efficient Cost-Driven Index Selection Tool for Microsoft SQL Server", In The VLDB Journal, pp. 146-155, 1997.

S. Chaudhuri, et al. "Autoadmin 'What-If' Index Analysis Utility", In Proc. of ACM SIGMOD, 1998. 12 pages.

Z. Chen, et al. "Efficient Computation of Multiple Group by Queries", In Proc. of ACM SIGMOD, 2005. 12 pages.

J. Goldstein "Improved Query Processing and Data Representation Techniques", 1999. 159 pages.

J. Goldstein, et al. "Compressing Relations and Indexes", In Proc. of ICDE, 1998. 10 pages.

P. Haas, et al. "Sampling-Based Estimation of the Number of Distinct Values of an Attribute", In Proc. of VLDB, 1995. 12 pages.

M. Hammer, et al. "A Heuristic Approach to Attribute Partitioning", 1979, pp. 93-101.

V. Harinarayan, et al. "Implementing Data Cubes Efficiently", In Proc. of ACM SIGMOD, 1996. pp. 205-216.

S. Papadomanolakis, et al. "Autopart: Automating Schema Design for Large Scientific Databases Using Data Partitioning", In SSDBM, 2004. 10 pages.

M. Poess, et al. "Data Compression in Oracle", In Proc. of VLDB, 2003. 11 pages.

J. Rao, et al. "Automating Physical Database Design in a Parallel Database", In Proc. of ACM SIGMOD, 2002, pp. 558-569.

M. Stonebraker, et al. "C-Store: A Column-Oriented DBMS", In Proc. of VLDB, 2005. 12 pages.

A. Szalay, et al. "The SDSS Skyserver: Public Access to the Sloan Digital Sky Server Data", In Proc. of ACM SIGMOD, 2002, 14 pages.

O. Tsatalos, et al. "The GMAP: A Versatile Tool for Physical Data Independence", VLDB Journal: Very Large Data Bases, 5(2): pp. 101-118, 1996.

G. Valentin, et al. "Db2 Advisor: An Optimizer that is Smart Enough to Recommend its Own Indexes", In Proc. of ICDE, 2000. 10 pages.

B. Zeller, et al. "Experience Report: Exploiting Advanced Database Optimization Features for Large-Scale SAP R/3 Installations", In Proc. of VLDB, 2002. 12 pages.

M. Garey, et al. Computers and Intractability. W. H. Freeman and Company, 1979, pp. 1-48.

M. Garey, et al. Computers and Intractability. W. H. Freeman and Company, 1979, pp. 49-104.

M. Garey, et al. Computers and Intractability. W. H. Freeman and Company, 1979, pp. 105-162.

M. Garey, et al. Computers and Intractability. W. H. Freeman and Company, 1979, pp. 163-218.

M. Garey, et al. Computers and Intractability. W. H. Freeman and Company, 1979, pp. 219-278.

M. Garey, et al. Computers and Intractability. W. H. Freeman and Company, 1979, pp. 279-340.

* cited by examiner

L_Linenumber  L_Shipinstruct - char(25)

| 1 | COLLECT COD |
| 5 | DELIVERY IN PERSON |
| 3 | NONE |
| 2 | NONE |
| 4 | TAKE BACK RETURN |
| 5 | COLLECT COD |

L_Shipinstruct  Map

| COLLECT COD | 0 |
| DELIVERY IN PERSON | 1 |
| NONE | 2 |
| TAKE BACK RETURN | 3 |

SELECT *l_linenumber*
FROM *lineitem*
WHERE *l_shipinstruct* = *'COLLECT COD'*

L_Linenumber  Map

| 1 | 0 |
| 5 | 1 |
| 3 | 2 |
| 2 | 2 |
| 4 | 3 |
| 5 | 0 |

| ledger | count |
|---|---|
| ACTUALS | 3,340,704 |
| REPORTS | 27,264 |
| | 7,424 |

AUTOMATED LOGICAL DATABASE DESIGN TUNING

BACKGROUND

A database management system (DBMS) facilitates interaction with database data. The DBMS efficiently manages requests or queries from users and programs so that these entities are free from having to know specifics pertaining to how and where data is physically stored. Furthermore, in handling requests, the DBMS ensures the integrity and security with respect to the data. Although other systems are emerging, relational database management systems (RDBMS) remain the most common DBMS.

Design of such a database system is multifaceted task involving three fundamental phases, namely conceptual, logical and physical. First, a database designer or administrator needs to develop a conceptual model. This can be accomplished by identifying important entities as well as relationships amongst them (i.e., ER modeling). Once the entities and relationships are understood, the data can be arranged in a logical structure. This logical structure or schema is typically designed to map to storage objects of the DBMS such as tables in a RDBMS. More specifically, a database schema is discovered to support the conceptual model. The database schema can identify tables, their definitions, constraints, foreign keys and the like. In the physical phase, the logical schema is realized in a DBMS. Stated differently, the logical schema is mapped against provided database options including indexes, heaps, views, etc.

Conventionally, the performance of a database system depends crucially on its physical database design. In particular, physical design structures such as indexes, materialized views and the like are selectively employed to improve performance significantly. For example, consider a particular database query issued numerous times throughout a day. If a database view is materialized to capture the query answer, response time can be reduced substantially.

Although a database administrator (DBA) or designer is typically responsible for database design, reliance on automated tools to make good design decisions has become increasingly common and necessary, especially with large-scale deployment of databases. These automated tools drastically reduce a DBA's burden. For example, DBAs often employ modeling tools that facilitate generation of conceptual, logical and physical models. Furthermore, automated tools are also employed to tune a physical database design, which may be refined later, if necessary, and implemented by the DBA.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to performance improving logical database tuning. A database schema (e.g., relational schema) can be transformed automatically in order to minimize execution cost of queries, updates and the like for an associated workload. Although physical structures such as indexes and indexed views have been shown to greatly improve query performance, they have drawbacks such as additional storage, redundancy and heavy update cost, among other things. Logical database tuning can provide distinct and complementary performance benefits to physical design tuning.

In accordance with an aspect of the innovation, numerous schema transformations are provided that include desirable properties. More specifically, mapping tables, vertical partitioning and frequent value elimination are disclosed, which are reversible, non-redundant and normalization preserving. Mapping table transformation exploits the fact that in many cases there are columns with only a few distinct values by creating a mapping table with distinct values of this column and replacing the column with an equivalent column that significantly reduces input/output cost of queries. Vertical partitioning partitions columns that are accessed together much more frequently than others to reduce query evaluation cost. Frequent value elimination exploits data distribution skews within one or more columns by partitioning out such columns, removing frequent values from the columns and storing the values separately as metadata, in a catalog or table, for instance.

In accordance with another aspect of the innovation, a simplified cost model is provided to evaluate transformations. In this model, the cost of evaluating a conjunctive SPJ (Select-Project-Join) query is proportional to the sum of the sizes of all relations that need to be accessed. Utilizing this simplified model, worst-case guarantees can be associated with particular transformations and employed in a selection process that identifies one or more transformations that can improve performance by reducing workload evaluation cost.

A rewrite mechanism is also disclosed in accordance with yet another aspect of the subject innovation. Since queries, updates and the like are written against a database schema, transforming a schema implies rewriting such collection operations. While this can be done manually by a user or application, the rewrite mechanism can be utilized to automatically generate a query for the transformed schema from a received query written with respect to the original schema, thereby relieving others from this burden.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The task of designing the schema of a database can be challenging for application/database developers. They need to pay attention to designing relations with the right level of normalization and integrity constraints to represent the application's business logic. Indeed, there are tools available that help developers with this aspect of schema design. However, the schema chosen by a developer can also significantly impact the performance of the application workload (e.g., SQL queries and updates issued by the application). While design structures such as indexes and materialized views can be crucial for workload performance, in most cases these are redundant structures and can therefore incur significant update and storage cost. Thus, even though schema (a.k.a. logical design) tuning is not a complete substitute for physical design tuning, choosing an appropriate schema brings complementary performance benefits, particularly for update intensive workloads or in storage constrained environments in very large databases. Among other things, provided herein are techniques for recommending schema changes of a database for performance based on data and workload characteristics. These techniques can be embodied in a logical schema tuning tools that can be valuable to developers during the application development stage, for instance.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
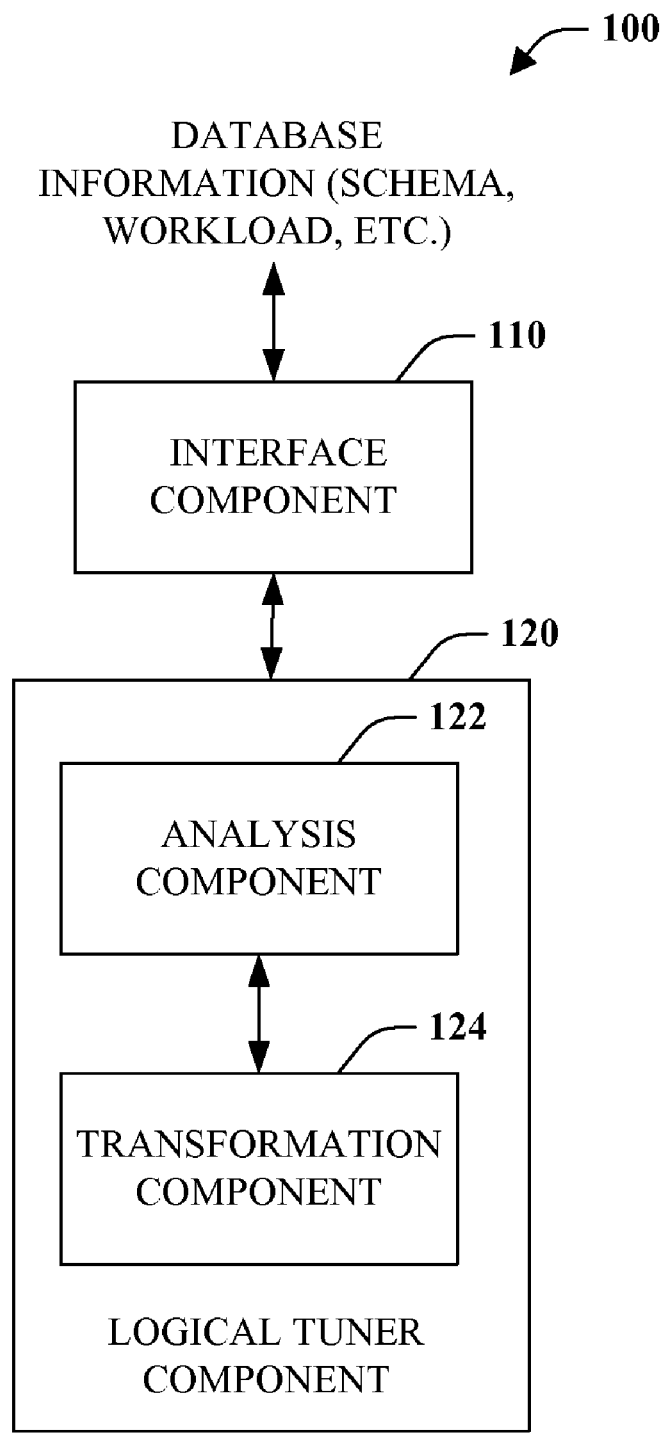
FIG. 1 is a block diagram of a database design tuning system.

Referring initially to FIG. 1, a database design tuning system 100 is depicted in accordance with an aspect of the subject innovation. System 100 includes an interface component 110 and a logical tuner component 120. The interface component 110 facilitates receipt, retrieval and/or access of a database and/or database information including but not limited to a schema and workload. The interface component 110 is communicatively coupled to the logical tuner component 120. The component 120 provides a mechanism to optimize logical database design. The logical tuner component 120 can automatically recommend or identify a set of one or more logical schema transformations that will improve database performance with respect to a workload.

More specifically, the logical tuner component 120 can include an analysis component 122 and a transformation component 124. The analysis component 122 can receive, retrieve or otherwise obtain or acquire a database schema and associated workload. Transformation component 124 can provide a plurality of schema transformation components or mechanisms. The analysis component 122 can interact with the transformation component 124 to identify the set of more or more logical schema transformations that will reduce execution cost for a workload or otherwise improve database performance. The identified schema transformation can be provided to a user for selection and initiation. Alternatively, execution of the transformation on the current logical database schema can be initiated automatically.

It should be appreciated that both logical schema tuning as well as physical design tuning can improve performance. While the two tuning approaches have strong parallels, they are distinct. Herein, a transformation is defined as physical if a query optimizer understands the transformation such that no re-writing is required outside the optimizer. Database systems guarantee physical data independence. The optimizer is responsible for mapping operations into plans that use the physical design structures. By contrast, schema or logical design tuning will require an entity other than the query optimizer (e.g., developer, middle layer . . . ) be responsible for rewriting affected database operations (e.g., queries, updates . . . ). Note that knowledge of a logical schema transformation could be added to optimizers thereby moving a logical transformation into a physical design structure.

Furthermore, the space of logical schema transformations possible by applying expressions such as SQL expressions to a given database schema, for example, can be very large since in principle any valid expression can be applied to generate a new relation. In some instances, it may be impractical to consider all transformations. In some such scenarios, the logic for updating application objects would become unacceptably complex. For example, suppose a schema transformation is allowed that replaces two existing tables with their cross product. While this could speed up a cross product query in the application over those two tables, it would make the logic for updating applications objects corresponding to each of the tables much more complex. Driven by these considerations, the inventors identified a set of desirable properties of logical schema transformations. By design, these properties favor transformations that complement the performance benefits that can be obtained via physical design tuning.

The space of transformations can be restricted to the desirable properties of reversibility, non-redundancy and normalization persevering, inter alia. Intuitively, a reversible transformation ensures that any schema transformations made can be reversed. That is, the original database can be recovered from the transformed database. This can be useful for example if the performance does not improve with the new schema. A non-redundant transformation ensures that the benefits of low of low update and storage that distinguish schema tuning from physical design tuning are preserved. Finally, a normalization preserving transformation guarantees that the existing normalization of the schema is not reduced. This is important so that the application logic for updating objects does not become too complex.

More formally, given a database with a schema T, let a particular schema transformation modify the database schema to T'. For reversibility, there are two requirements. First, data in T' should be expressible as an expression in terms of T. This property is necessary to import the data from T to the new schema T'. Second, data in T should be expressible as an expression in terms of T'. This property ensures that the modified schema can be reverted back to the original schema, if needed, for example if performance with the new schema degrades for some reason.

With respect to non-redundancy, T' should be non-redundant in the sense that removal of any single column from T' breaks the inverse transformation described above. Non-redundancy is desirable for reasons such as low storage and low update overhead. This property is also a key distinguishing aspect compared to conventional physical design structures (e.g., indexes, materialized views . . . ) which consume additional storage space and incur update overhead.

Per normalization preservation, T' should not reduce the normalization level over T. For instance, if T is in BCNF (Boyce-Codd Normal Form), T should be at least as normalized as a BCNF relation. While the non-redundancy property prevents redundancy at the column level, this property is aimed at eliminating redundancy that arises from dependencies (e.g. functional and multi-valued dependencies) at the schema level. To understand the difference between non-redundancy the normalization-preserving properties, consider the example of two relations R(A, B) and S(A, C), with the functional dependency A→B holding. Replacing R and S with T=R⋈S, there is no redundancy but normalization is not preserved. Both these properties have the effect of keeping the rewriting of updates relatively straightforward (since the transformations satisfying these properties cannot introduce more places where the same value needs to be updated).

These properties provide a framework for which a number of possible logical schema transformations can be explored. In later sections, several transformations that provide substantial performance benefits are provided.

Figure 2:
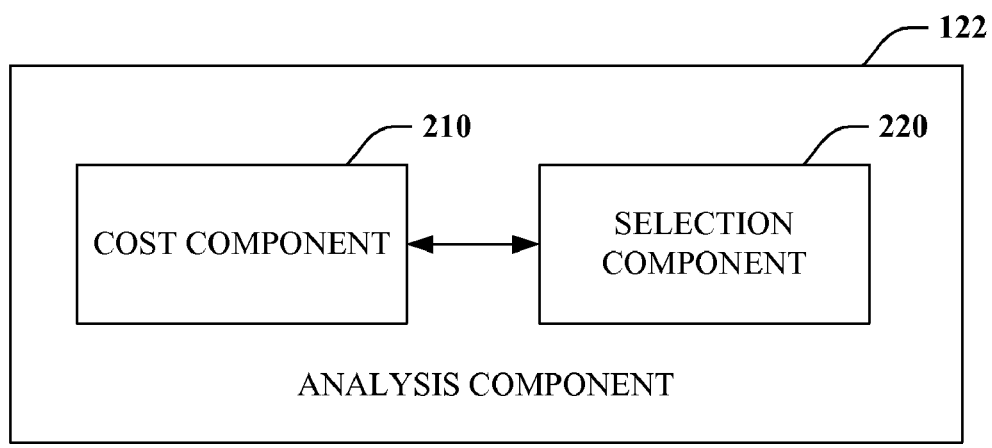
FIG. 2 is a block diagram of an analysis component.

FIG. 2 illustrates an analysis component 122 in accordance with an aspect of the subject innovation. The analysis component 122 facilitates identification of one or more appropriate schema transformations that improves database performance. Included within component 122 are cost component 210 and selection component 220. Given a database D, transformed database D' and a query, it is desirable to be able to compare and determine which database is superior with respect to performance of the query. The cost component 210 facilitates such evaluation. Of course, the ideal metric would be to physically materialize the transformed database. However, execution cost is not a feasible metric in practice. Therefore, an efficient cost model is needed to compare performance of one or more queries across disparate databases. In one instance, the cost component 210 can interact with a conventional query optimizer cost model. The server extensions necessary to support such a cost model are already present in most commercial database systems. Using the optimizer cost model allows a logical schema tuning tool to be synchronized with the query optimizer.

While employing the optimizer cost model is important for a logical schema tuning tool, the cost functions used by the optimizer are quite complex. This makes it difficult to analytically compare the performance of a query across two databases. Accordingly, for purposes of being able to better analyze and provide worst-case guarantees for the algorithms for automated logical schema tuning, a simplified cost model can be utilized by the cost component 210.

The simplified cost model for analytical purposes assumes that the cost of evaluating a query is proportional to the linear combination of sizes of all relations that need to be accessed. Such a model can be reasonable, for example, if cost of a query is dominated by the input/output cost of scanning relation. Updates can be processed in two stages: First, the conditions in the update can be executed as a "SELECT" query to identify the rows to be updated, and then the identified rows are updated in the second stage.

The selection component 220 of analysis component 120 interacts with the cost component to identify an optimal combination of one or more schema transformations. For instance, the selection component 220 can select a transformation schema and receive a worst-case cost estimate for a database that implements the selected schema from cost component 210. Based on such a process the selection component can discover a set of one or more transformations that reduce the cost of workload execution.

Figure 3:
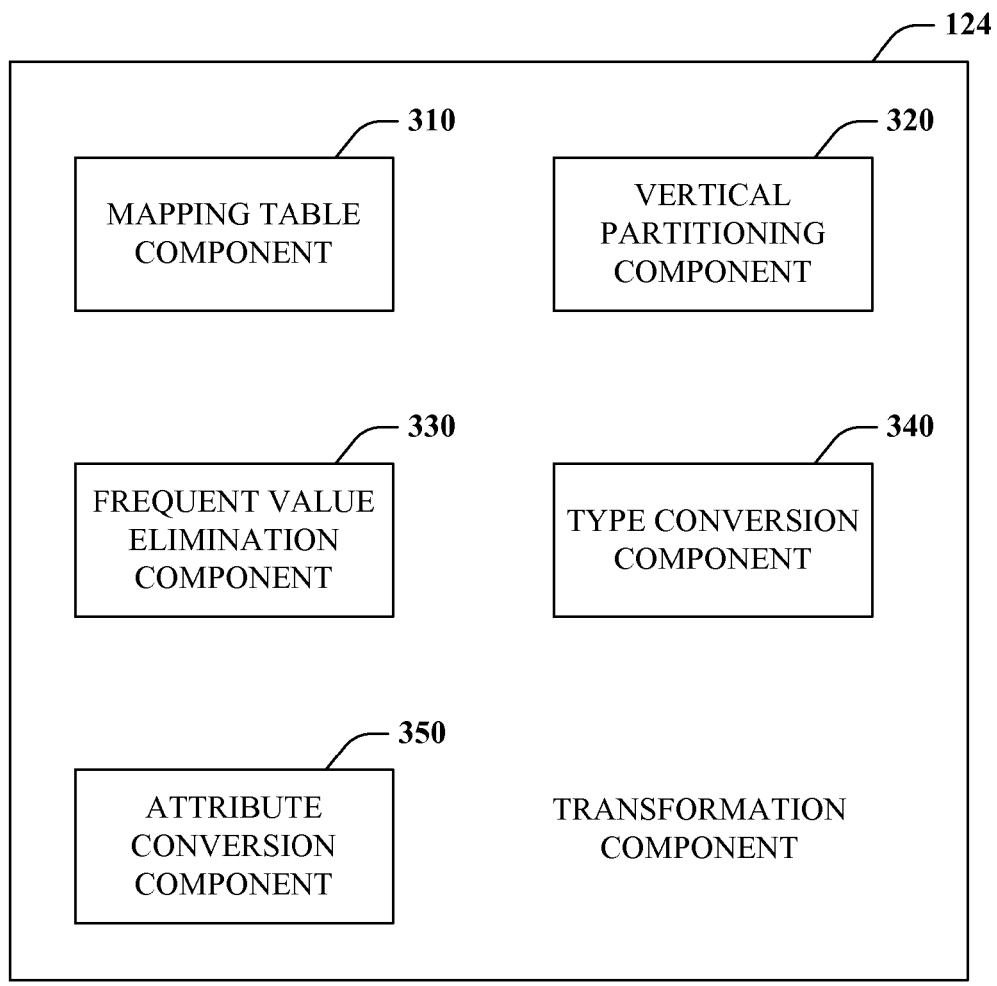
FIG. 3 is a block diagram of a transformation component.

Turning to FIG. 3, a transformation component 124 is depicted in further detail in accordance with an aspect of the innovation. The transformation component 124 provides a mechanism for modifying databases schemas to improve performance in one or more of a plurality of disparate manners. As illustrated, the component 124 includes mapping table component 310, vertical partitioning component 320, frequent value elimination (FVE) component 330, type conversion component 340 and attribute conversion component 350.

Figure 4:
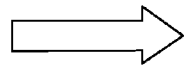
FIG. 4 illustrates an example utilizing mapping tables.

It is often observed that tables include wide attributes (e.g., values consume many storage bytes), but few distinct values. The mapping table component 310 is operable to reduce the width of the table in such cases, thus enabling faster access. This can be achieved by mapping wide attributes with small domains to narrower attributes (e.g., integers). Turning briefly to FIG. 4, consider an example in which lineitem table in a database has char(25) and attribute l_shipinstruct includes just four distinct values. In such a situation, queries could benefit greatly if this attribute is mapped into integers needing just four bytes. The lineitem table has been transformed to lineitem' and mapping table map_linenumber. The query in FIG. 4 can then be rewritten to "SELECT l_linenumber FROM lineitem', map_linenumber WHERE l_shipinstruct='COLLECT COD' AND lineitem'.map=map_linenumber.map," which executes faster the original query.

Formally, given a relation schema $R(A_1, A_2, \ldots, A_n)$, a mapping table on attribute $A_1$ transforms the schema into two relations $R'(A'_1, A_2, \ldots, A_n)$ and $M_1(A_1, A'_1)$. $M_1$ includes a one-to-one map from the original values $A_1$ in R to the mapped values $A'_1$ (i.e., the functional dependencies $A_1 \rightarrow A'_1$ and $A'_1 \rightarrow A_1$ hold in $M_1$). One could also have multi-attribute mapping tables such as $M_{12}(A_1, A_2, A'_{12})$ where the functional dependences are $A_1 A_2 \rightarrow A'_{12}, A'_{12} \rightarrow A_1$ and $A'_{12} \rightarrow A_2$. Several non-conflicting mapping table transformations could be applied to the same relation.

Note that all queries over R can be automatically rewritten by replacing R with the join of R' and $M_1$; this join also could be omitted if the query does not reference the attributes being mapped. A mapping table would be useful if the width reduction offsets the join cost incurred in the rewritten query. Examples of cases where mapping tables could be particularly useful are: (1) few distinct values in the column(s), (2) column(s) not accessed in the query or (3) selective predicate on the column(s). While the ideal case is if mapping tables are small and reside in memory, significant gains are obtainable even in cases where they reside on disk.

In the presence of mapping tables, updates are performed as follows. Let an attribute A be mapped to A' in a relation R. If the update statement uniformly updates all values in A, such as replacing every occurrence of A=x with A=y, then this update need be made only in the mapping table. If, however, the update is based on conditions on other attributes of the table too, then the update should be made on the mapped value A' in R as well as the mapping table. In the most general case, the update would be made in R and then if the new updated A was not present earlier, an insert would have to be made in the mapping table. If, however, the update sets the value of A to an existing value, only R need be changed. Updates on multiple attribute mapping tables can be treated as updating the set of attributes constituting the mapping table. Insertions/deletions can be carried out in a similar fashion, but details have been omitted for purposes of brevity.

The vertical partitioning component 320 of FIG. 3 exploits the fact that certain columns are accessed together much more frequently than others by partitioning attributes. Vertical partitioning is based on the premise that queries usually access only a few attributes of a table even if tables contain many attributes. In such a case, a careful partitioning of the table into sets of attributes occurring together in queries could result in most queries being answerable by accessing only a few partitions thus reducing execution time.

Formally, given a relation schema $R(k, A_1, A_2, \ldots, A_n)$ with k being the key of R, a vertical partitioning of R results in a set of relations, each of which contains k and a subset of the attributes $A_1$ through $A_n$. The presence of the key in every partition ensures that queries over R can be automatically rewritten into queries over the transformed schema as a join of the relevant partitions.

Updates in a vertically partitioned schema are performed in a natural way. An update of a particular row in a relation R would result in updating the partitions containing the relevant attributes. If the updated attributes and conditions on the update span multiple partitions, this would be translated to an update statement involving a subquery. The idea of vertical partitioning has been explored in past work, but is employed here with respect to giving formal guarantees under certain conditions, and integrating it with other logical schema transformations.

The frequent value elimination component 330 transforms a schema to exploit the fact that data distributions within a column are often highly skewed. Often columns in a relation include one very frequent value that is also not referenced in most queries. One example is the case of frequent NULL values, which are uninteresting for queries and are eliminated from the result because of selection conditions. The FVE component 330 exploits this pattern by partitioning out such columns and storing the most frequent value separately. This reduces the height of the column and benefits queries not accessing the frequent value.

Figure 5:
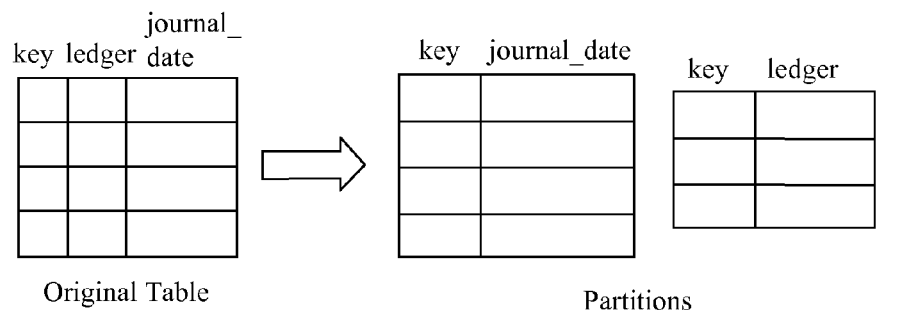
FIG. 5 provides an example of employment of frequent value elimination.
Figure 5:
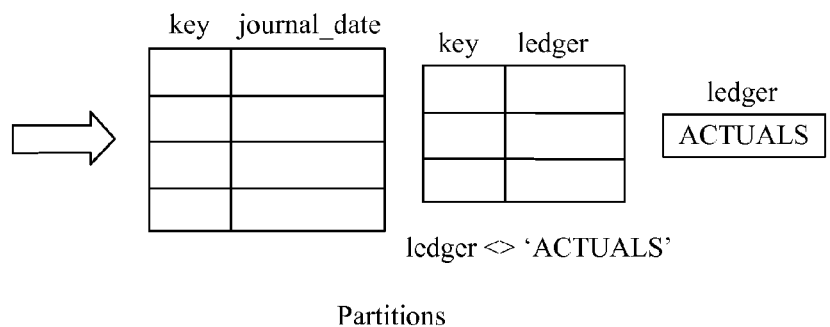

Referring to FIG. 5, an example is depicted from a popular conventional database. Note that the value 'ACTUALS' occurs very frequently, while 'REPORTS' and the empty string do not. As indicated, "ACTUALS" occurs 3,340,704 times, "REPORTS" occurs 27,264 times, and the empty string appears 7,424 times, which can be obtained by analyzing the data. The FVE component 330 can exploit this skew in data distribution to improve performance. First, the column including such skewed data can be identified and partitioned out. For instance, if a original table includes columns key, ledger, journal_date, and the ledger column includes skewed data, then the original table can be partitioned into two tables one including columns key and journal_date and the other including key and ledger. At this point, the transformation is similar to that which may be done as part of vertical partitioning. Accordingly, the original data can be obtained by joining the two tables based on the key. Besides the benefits of vertical partitioning, nothing else has been gained up to this point. The table including columns key and ledger contains 3,375,392 rows ("ACTUALS," "REPORTS" and empty string). Now, the most frequent value "ACTUALS" and be stripped from the table. The table that is left behind includes all rows that are not equal to "ACTUALS" (i.e., "REPORTS" or empty string). The stripped value "ACTUALS" can be a metadata entry and/or stored separately, for instance in a catalog or table.

The challenge is to enable the original data to be reconstructed. Earlier this could be done easily with a regular SQL inner join. Now it is slightly more complex. In particular, a SQL outer join can be performed between the two partitioned tables, which will return all keys. If there is a matching key in both tables the values can be returned as such. However, for the case where a key is not in the newly created ledger table, there will be empty entries likely represented as nulls. The metadata association can then be employed to replace all nulls that result from the outer join with the value "ACTUALS."

In this scenario, the original data can be returned and much less information was needed to be stored than would have been stored originally. Assume that each column value is eight bytes ("ACTUALS," "REPORTS" and empty string). Frequent value elimination saves approximately 27 million bytes (3,340,704*8 bytes). Although, some overhead would occur with respect to key duplication, it would be much smaller than the total size. Further, the benefit comes at the cost of an additional join in the rewritten query. However, FVE still leads to huge advantages in terms of performance.

Formally, given a relation $R(k, A_1, A_2, \ldots, A_n)$ with k being the key of R, applying FVE on attribute $A_1$ results in $R'(k, A_2, A_3, \ldots, A_n)$, and $F_1(k, A_1)$ with the most frequent value not appearing in $F_1$ but stored in a separate single-cell relation. If the most frequent value in $A_1$ is a, $F_1$ is a result of the SQL query "Select k, $A_1$ From R Where $A_1 \neq a$". FVE naturally extends to multi-attribute combinations; for instance, for $A_1$ and $A_2$ a single most frequent pair is eliminated to construct $F_{12}(k, A_1, A_2)$, and R' as a projection of R eliminating $A_1$ and $A_2$. Since the most frequent value is maintained separately, any query on R can be translated to a query over the modified schema. For example, if the most frequent value of $A_1$ happens to be NULL, the original R can be constructed as an outerjoin of R' and $F_1$. If the most frequent value is not NULL, R is constructed as an outerjoin replacing NULL with the most frequent value; alternately, if R contains NULL but it is not the most frequent value, R is reconstructed as a union of the join with the non-frequent values, and the outerjoin of the rest of the keys, replacing NULL with the frequent value in the outerjoin.

A uniform update on tables with frequent elimination, i.e., with the condition of update and the attribute being updated being the same, is performed in a similar fashion as vertical partitioning. In other cases, if the value to which an attribute is being updated happens to be the most frequent value, this row would have to be eliminated (as it now has the most frequent value). If, however, a row having the most frequent value is being updated to a non-frequent value, this row would have to be inserted into the table with the updated value. In both these cases, the key of the row being updated can be inferred and so the update can be performed correctly. Just as the performance of most database structures, such as indexes, may degrade with updates, even in frequent value elimination after several updates the most frequent value of a column could change. Note that this does not compromise the correctness of the query result in anyway; moreover, an existing solution continues to give benefits, but may not remain optimal.

It should be noted that FVE component could operate with respect to multiple values. More specifically, FVE can be extended to eliminating k-frequent values from a column, retaining the mapping of a key to the attribute value for all but the most frequent value.

The primary advantage of frequent value elimination is the reduction in I/O cost. Of course, a system may reap these benefits by eliminating non-frequent values as well, e.g., a few very large attribute values that are not frequent but also not accessed often. Among other things, algorithms described infra for selecting FVE can be applied to this case as well.

Returning to FIG. 3, the type conversion component 340 and/or the attribute conversion component 350 can be utilized to transform a database schema. Type conversion component 340 is operable to change the data type of one or more attributes. For example, conversion of char(n) to varchar(n) could reduce the size of the table and be beneficial if most values tend to have much less than n characters. Attribute conversion component 350 can add one or more computed columns to a schema. For instance, if many queries refer to the sum of attributes $A_1$ and $A_2$, it may be worthwhile to pre-compute this column.

The described transformation components by no means exhaust the space of possible schema transformations that can be employed with respect to the subject innovation. Other transformations that can be utilized herewith are also possible and will be apparent to one in the art upon reading this detailed description. It is intended that these transformation also fall within the scope of the innovation.

Figure 6:
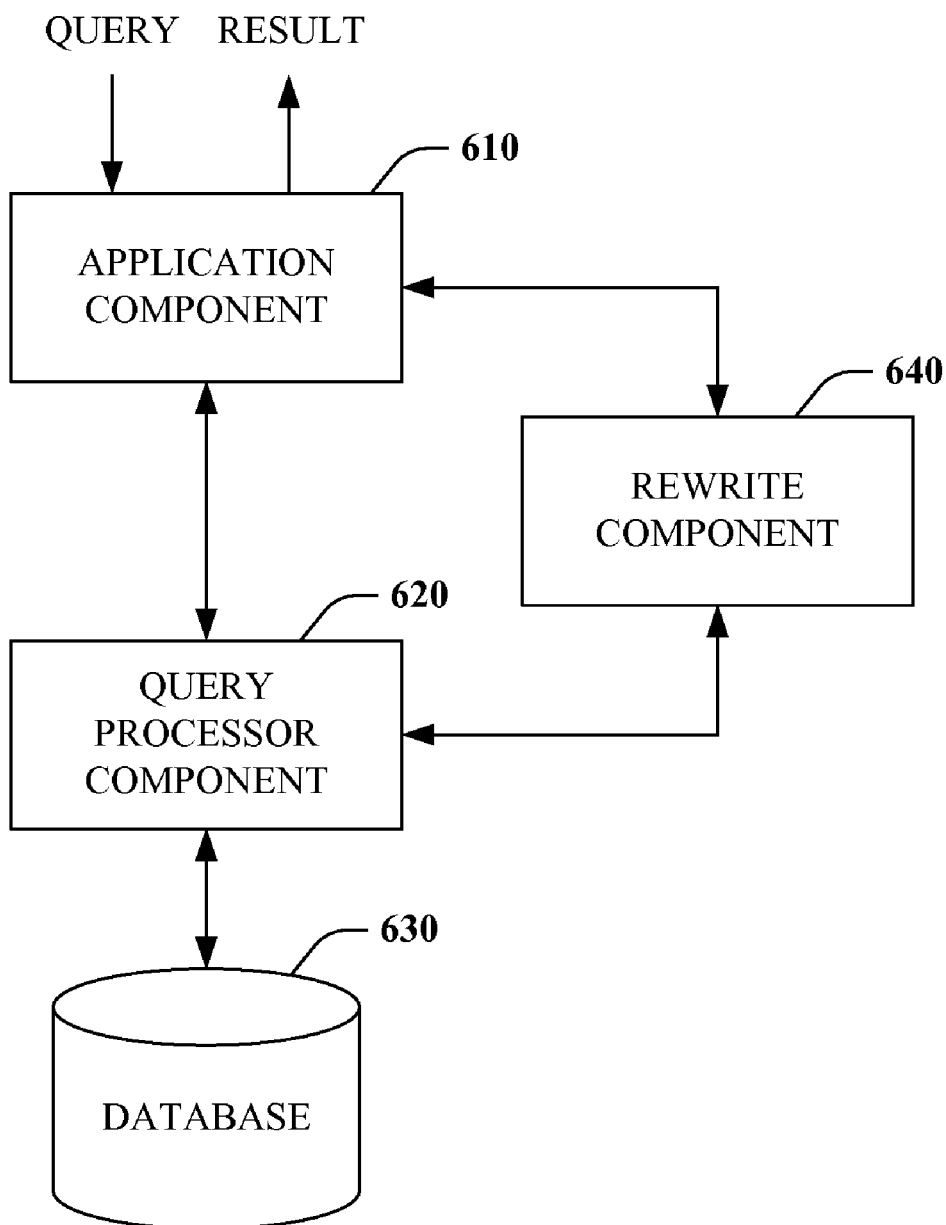
FIG. 6 is a block diagram of a system for interacting with a logically tuned database.

Referring to FIG. 6, a system 600 for interacting with a logically tuned database is depicted in accordance with an aspect of the subject innovation. As mentioned previously, there is a significant difference between tuning the physical design of a database and tuning the schema of a database for performance. Since application queries and updates are all written against the schema, transforming a schema implies potentially rewriting the queries and updates. This is not an issue with physical design turning since database systems guarantee physical data independence. There are at least two possible approaches to address this case: (a) The application queries and updates are modified by the application developer to execute against the new schema; or (b) For each query/update in the workload automatically rewrite the query/update against relations in the new schema. System 600 facilitates automatic rewriting of the queries. Accordingly, a view is generated over the new schema for each relation in the original schema and applications can remain unchanged.

In particular, system 600 includes an application component 610, query processor 620, database(s) 630 and rewrite component 640. The application component 610 is operable to provide queries and receive results. The application component 610 transmits a received query to the query processor component 620 for evaluation against one or more databases. The processor component 620 can execute the query, retrieve results and provide such results back to the application component 610. However, where a database schema is transformed during tuning, a query may not return expected results. The rewrite component 640 is communicatively coupled to the application component 610 and the query processor component 620. The rewrite component 740 can rewrite or augment queries with respect to a transformed database schema and provide the augmented queries to the processor component 620 to ensure desired query results. Accordingly, the rewrite component 740 can perform query mapping with respect to database schemas.

Figure 7:
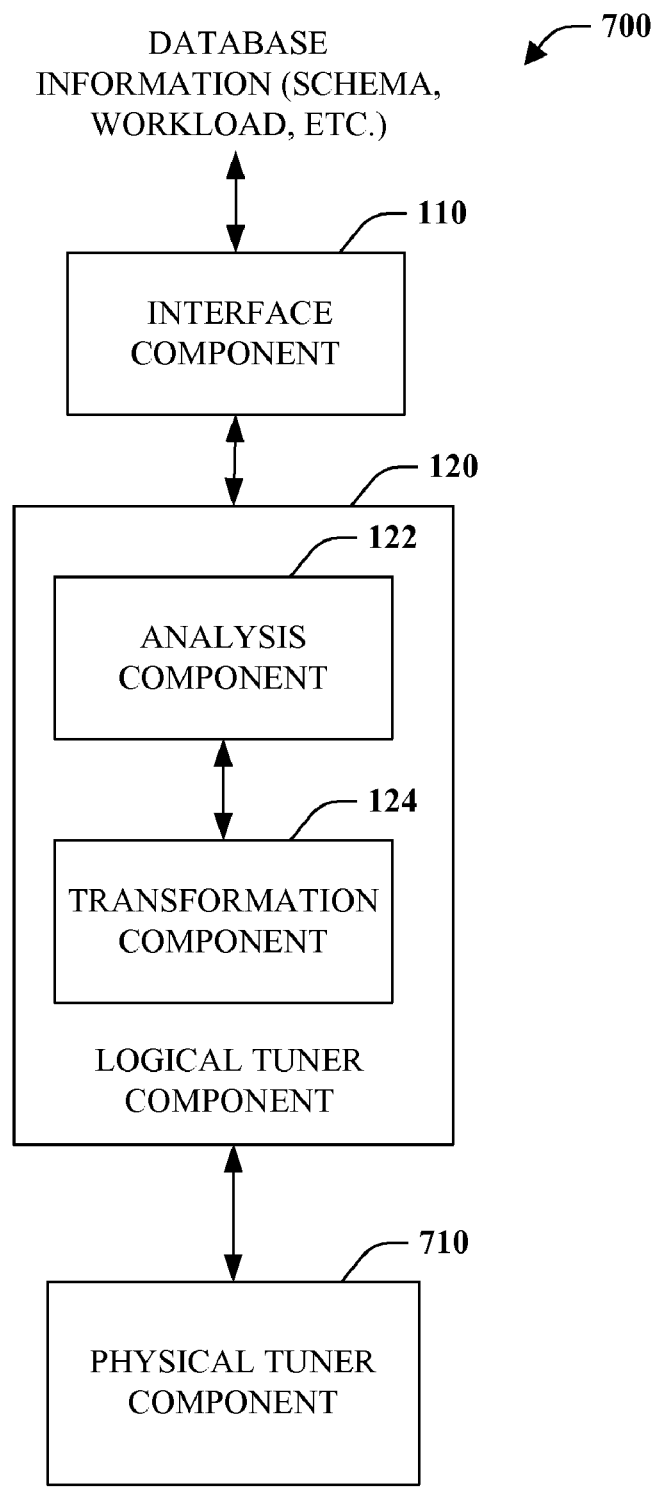
FIG. 7 is a block diagram of a database design tuning system.

FIG. 7 depicts a system 700 for database tuning in accordance with an aspect of the subject innovation. Thus far, physical design has been ignored. In reality, a tuning system needs to find the best physical and logical design substantially simultaneously. System 700 can operate in such a fashion. More particularly, system 700 includes an interface component 110 and a logical tuner component 120 comprising analysis component 122 and transformation component 124, as previously described. Additionally, the system 700 includes a physical tuner component 710. The logical tuner component 120 and the physical tuner component 710 are communicatively coupled so as to enable cooperation and interaction between the components to optimize overall performance.

Many different approaches can be employed to find the best logical and physical design for a database. For instance, a brute-force approach can be utilized in which every combination of logical and physical design is explored, and then the best configuration is chosen. Another approach is staging. That is, first find the best logical design for a workload oblivious of the physical structures, then freeze the logical design and find the best physical structures to optimize performance. Preliminary experiments have shown that the stage approach outperforms pure logical as well as pure physical design tuning. While the staged approach to combining logical and physical design tuning is more reasonable than a brute-force complete search and gives good results, it can be fail to exploit commonalities between logical and physical design. Hence, an integrated approach can perform even better. The idea is not to have to go through the entire physical design tuning after each incremental change to the logical schema, but instead more efficiently find the best structures.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such means and/or mechanism can be employed by system 700 to facilitate identifying the best combination of logical and physical tuning to optimize overall database performance.

In view of the exemplary systems described supra, methodologies that may be implemented in accordance with the disclosed subject matter will be better appreciated with reference to the flow charts of FIGS. 8-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
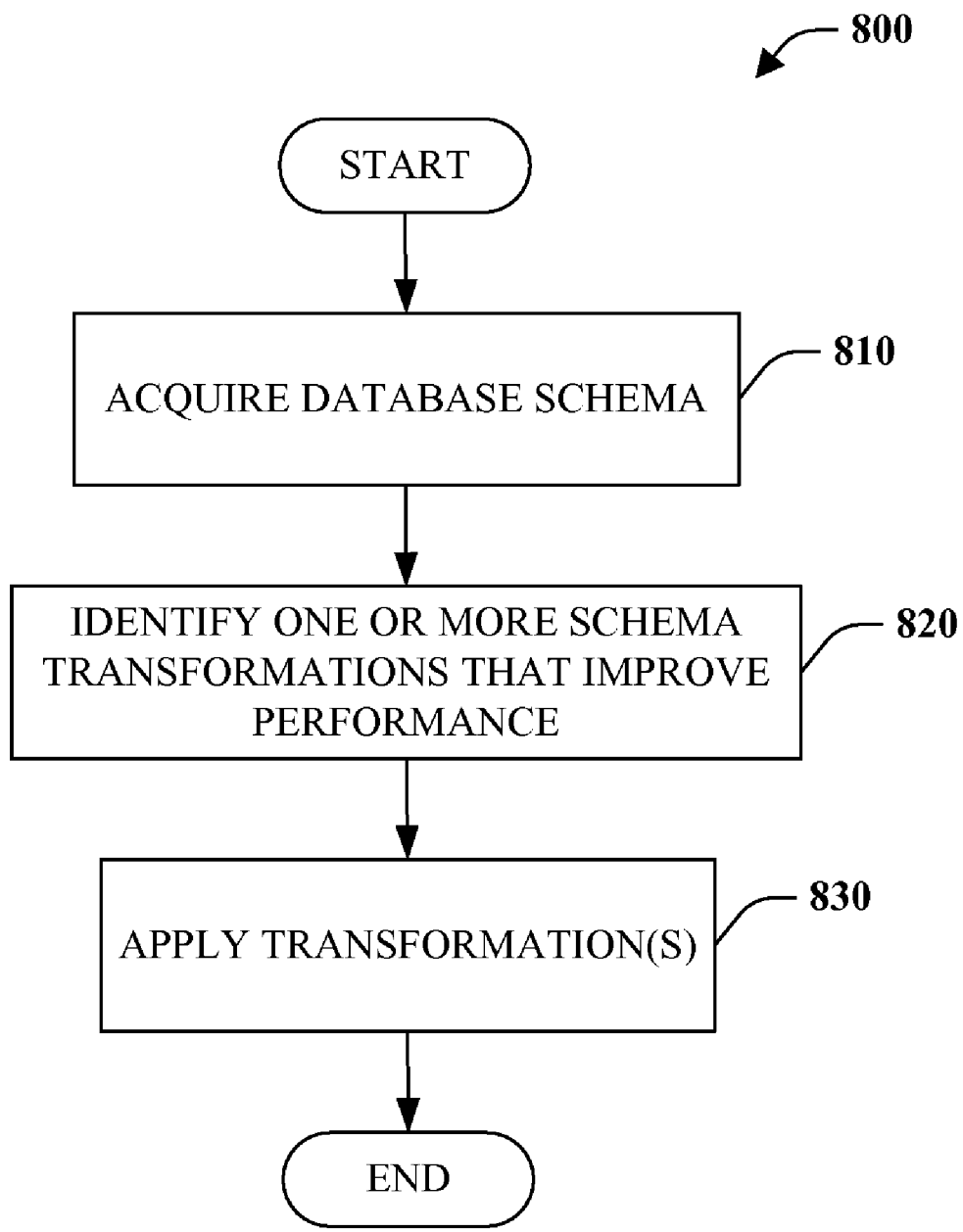
FIG. 8 is a flow chart diagram of a method of logically tuning a database.

Referring to FIG. 8, a method 800 of logically tuning a database is depicted in accordance with an aspect of the subject innovation. At reference numeral 810, database information such as the associated schema workload and the like are obtained. At numeral 820, one or more schema transformations are identified that will improve the performance of the database with respect to the database workload. Such transformations can include but are not limited to mapping tables, frequent value elimination, vertical partitioning as well as type and attribute conversion. It should be appreciated that transformations may be limited or selected by a user such as a database administrator. Furthermore, transformations can be identified based on physical design structures and the like. At reference numeral 830, the transformations are applied to the database. Queries can subsequently be rewritten manually or automatically to account for the schema transformation.

Figure 9:
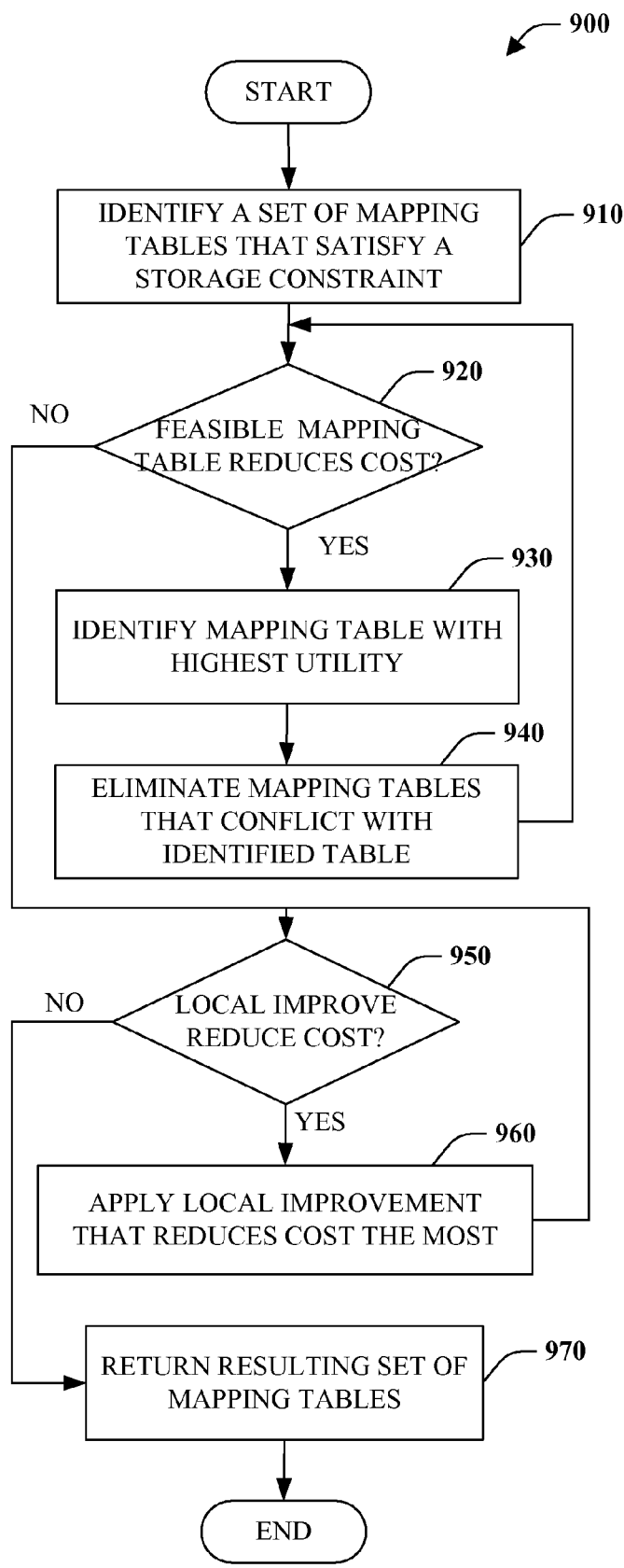
FIG. 9 is a flow chart diagram of a method of schema transformation that utilizes mapping tables.

FIG. 9 illustrates a method 900 of schema transformation employing mapping tables. As previously described, mapping tables can be employed to reduce the width of a table and thus enable faster execution by mapping. This can be achieved by mapping wide attributes with small domains to narrower attributes. The mapping table selection problem can be formally defined as follows: Given a database D with schema T and a workload W, find the set of non-conflicting mapping tables M=$\{M_1, M_2, \ldots, M_k\}$, such that Cost (W', T') is minimized. While this problem can be N-P hard (Non-deterministic Polynomial-time hard), method 900 provides a greedy approach based on the idea that mapping tables which give good benefit per number of attributes mapped are likely to be present in the solution.

More specifically, at reference numeral 910 a set of mapping tables that satisfy a storage constraint are identified. At 920, a determination is made as to whether there exists a feasible mapping table application that reduces cost. If yes, the method proceeds to 930. If no, the method continues at 950. At reference numeral 930, the mapping table with the highest utility is identified, where utility is defined by the incremental benefit in cost produced by it divided by the number of attributes it is defined over. At numeral 940, mapping tables that now become infeasible or conflicting are eliminated and the method continues at 920 until the there does not exist a feasible mapping table application of which reduces cost. At reference numeral 950, a check is made to determine whether there are any local improvements that can reduce cost. If yes, then at 960 the local improvement that reduces cost the most is performed. Examples of local improvements include merging two existing mapping tables, splitting an existing multi-attribute mapping table and/or incorporating a new mapping table by swapping or merging it with an existing one, among other things. Application of local improvements enables the method to catch some solutions possibly missed by the greedy approach. If there are no local improvements that reduce cost then a local minimum has been reach and the method proceeds to numeral 970, where the set of one or more resulting mapping tables can be returned and/or applied to a database.

As mentioned earlier, treating the optimizer estimated cost function as a "black box," no theoretical worst case guarantees can be given without exploring the entire search space. However, using the simplified cost model the method 900 is a k-approximation algorithm, where k is the maximum number of attributes that can be grouped in any mapping table. This can be good or bad depending on the value of k. Of course, in practice, it is not expected that more than a few attributes will be highly correlated with each other and hence expect a small value of k (e.g., $k \leq 2$). In such cases, most useful mapping tables would only have one or few attributes, implying a really good approximation ratio.

Figure 10:
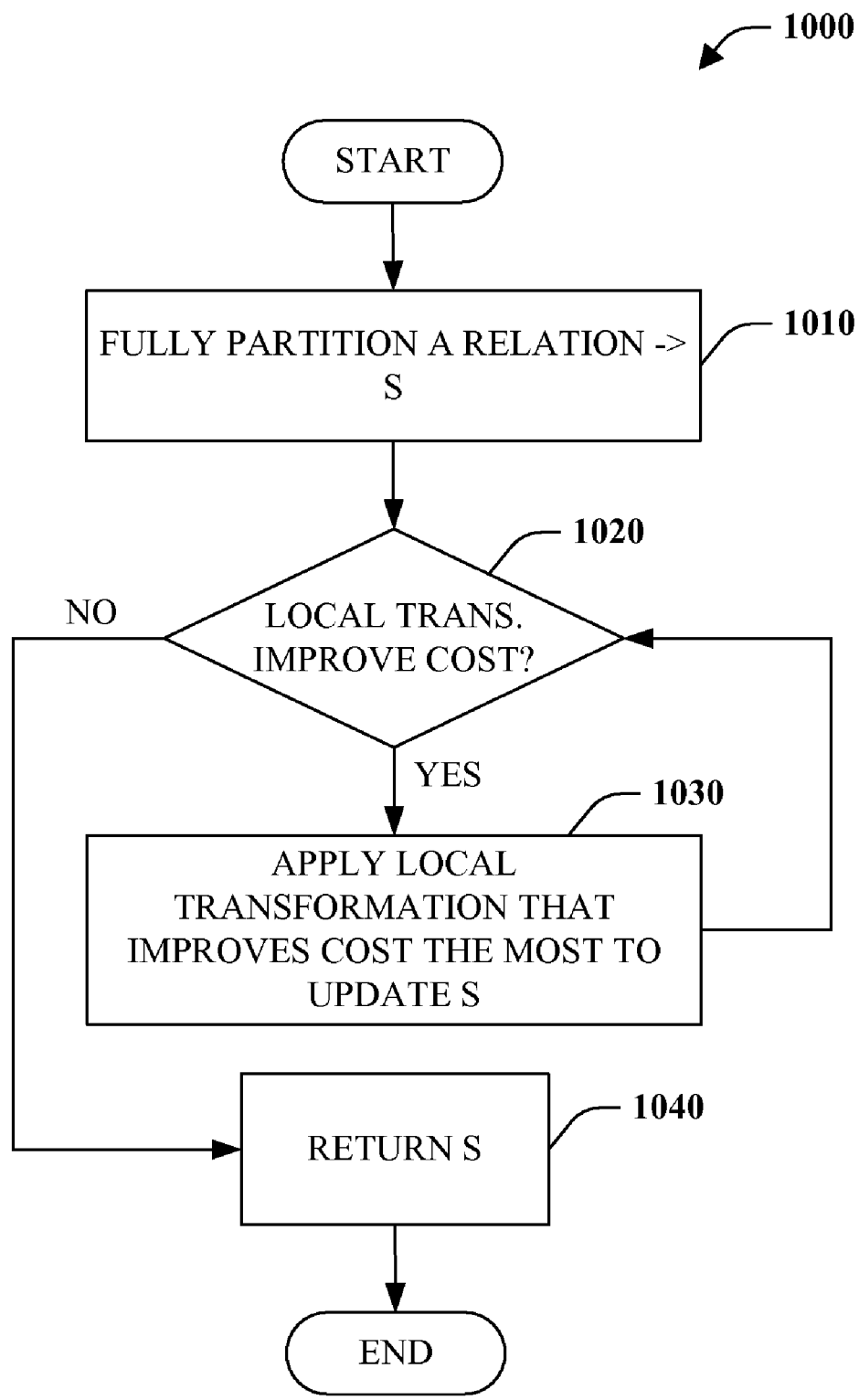
FIG. 10 is a flow chart diagram of a method of schema transformation that exploits vertical partitioning.

FIG. 10 illustrates a method 1000 of schema transformation via vertical partitioning. This type of transformation exploits the fact that certain columns are accessed together much more frequently than others. Hence, splitting a table into vertical partitions can greatly reduce the I/O cost of queries. The vertical partitioning problem can be formally defined as follows: Given a database D with a schema T over a single relation R(k, $A_1, A_2, \ldots, A_n$), and a workload W, find a vertical partition of R to obtain T' such that Cost (W', T') is minimized. Here W' is the rewritten workload over T'. Note that while this problem is defined in terms of a single relation, it could be analogously defined for a database with multiple relations. Additionally, the problem can be considered N-P hard; however, method 1000 provides a greedy solution that progressively improves the solution by merging groups of attributes.

At reference numeral 1010, a schema is fully partitioned for a relation. At 1020, a determination is made as to whether a local transformation to the schema improves execution cost. Such local transformation can include but are not limited to merging two existing vertical partitions, moving an attribute from one partition to another, and moving an attribute out of one partition to create a new partition. If a local transformation can improve cost, the local transformation that improves the cost the most is applied to the schema at 1030 producing an updated schema. The method then proceeds back to numeral 1020 and can continue to loop until the local transformation can no longer improve schema cost. At that point, the schema is returned at 1040 and the method terminates.

Under the simplified cost model described supra, where the cost of evaluating a query is given by a linear combination of sizes of the relations, finding a vertical partitioning gives a constant factor approximation of the optimal solution. The constant factor is roughly twice that of the join overhead. Therefore, for instance, if the cost of joining two relations is the sum of the sizes of the input, what results is a 2-approximation.

Frequent value elimination (FVE) can reduce the height of a column by partitioning at least one frequent value that is not referenced in most queries. More formally the problem can be stated as follows: Given a database D with a schema T over a single relation R(k, $A_1, A_2, \ldots, A_n$) and a workload W, find the sets of columns to apply frequent value elimination to giving T', such that Cost(W', T') is minimized. Here W' is the rewritten workload over T'. Frequent value elimination of a column or group of one or more columns (referred to herein as a column group) also involves selecting a threshold, and then frequent value(s) to be eliminated. These columns are first vertically partitioned and then frequent values are eliminated. FVE is therefore at least as hard as vertical partitioning which is known to be N-P hard.

Figure 11:
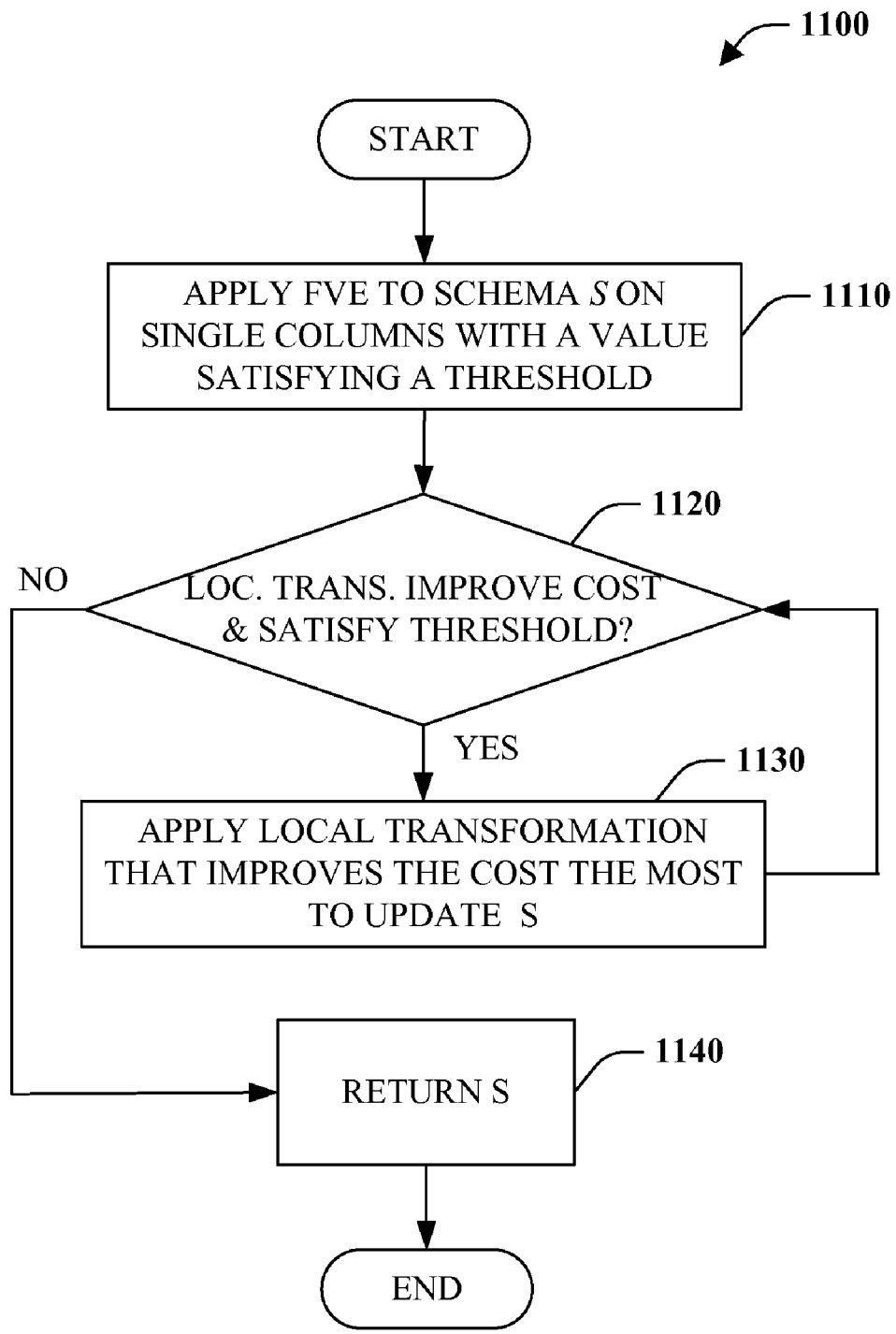
FIG. 11 is a flow chart diagram of a method of schema transformation that employs frequent value elimination.

Referring to FIG. 11, a method 1100 of frequent value elimination is depicted in accordance with an aspect of the subject innovation. At reference numeral 1110, frequent value elimination is applied to a schema S on all single columns that satisfy a frequency threshold. In other words, columns with all values having a frequency of the most frequent value below the threshold are not considered for elimination. A standard method of counting frequent item sets can be employed here to find all sets of columns whose most frequent value satisfies the threshold. A group of columns satisfies the threshold if every subset of it also satisfies the threshold. At numeral 1120, a determination is made concerning whether any local transformation exist that improves the cost and satisfies the threshold (the resulting new column groups also have the most frequent value appearing in greater than the threshold fraction of the tuples). Examples of such local transformation include but are not limited to merging two existing column groups into the schema, moving an attribute from one column to another, moving an attribute out of one column group and creating a new-single column frequent value eliminated column. If a local transformation exists that improves cost and obeys the threshold, the transformation that improves cost the most is applied at 1130 to update the schema. The method then loops back to 1120 where it is determined additional local transformations can be applied. The schema can then be returned at 1140. If a local transformation does not exist which improves cost and satisfies the threshold, then the schema can simply be returned without application of any local transformation at 1140.

Once again using same cost model of execution is considered where the cost of execution of a query is given by a linear combination of the sizes of the relevant relation. In this scenario, the result for vertical partitioning holds here too: The resulting cost of the frequent value elimination method 1100 is at most a constant factor worse than the optimal cost.

Frequent value elimination is in essence a kind of compression, but the approach of choosing FVE columns is unique as it takes into account the data as well as the workload. The latter can also be very important in choosing appropriate redesign (e.g., it is favorable to compress columns that are accessed often). Apart from the using the data and the workload, also provided is a worst-case approximation guarantee under the simplified cost model.

Further note that while the method 1100 is applicable to elimination of the single most frequent value (e.g., threshold frequency=0.5), FVE also extends to multiple values. Here the space increases and consequently the problem becomes harder about which to reason. Moreover, optimal solutions are likely to eliminate only the single most frequent value. On elimination of multiple frequent values for a column, the mappings from the keys to frequent values also need to be explicitly stored, thus reducing efficiency.

Thus far, three logical schema transformations have been considered in isolation and methods have been provided for solving the associated optimization problems. However, these and other schema transformations can be employed in combination to provide an integrated approach to logical schema tuning. The problem thus becomes how to identify the best combination of transformations amongst a plurality thereof. More formally, the problem is defined as follows: Given a database D with schema T, and a workload W, find the a new schema T' obtainable through a series of mapping table, FVE and vertical partitioning transformations on T, such that Cost(W', T') is minimized.

One way to attack this problem is to stage the various transformations in a predetermined order. For instance, first find the best vertical partition of the database D to obtain $D_1$, then apply the FVE algorithm on $D_1$ to obtain $D_2$, and then apply the mapping table method on $D_2$, and so on. While this is a simple approach, it has several problems. Firstly, one would have to predetermine an order in which transformations would be explored. A more serious problem is that all the transformations under consideration have several commonalities, and these are not being exploited when staging. Hence, this approach is likely worse than an integrated approach.

Here is a simple example where one particular order of staging the transformations fails to exploit commonalities and results in a solution worse than the subject integrated approach described next. Consider the char(25) l_shipinstruct attribute of lineitem, which contains only four distinct values and is therefore a good candidate for mapping. A staged approach in which mapping table transformations are performed before vertical partitioning would map l_shipinstruct. However, it turns out that for the TPC-H benchmark, forming a separate partition for l_shipinstruct and not mapping it is the best option. This is found by the following integrated approach as it explores vertical partitioning and mapping tables in parallel.

Figure 12:
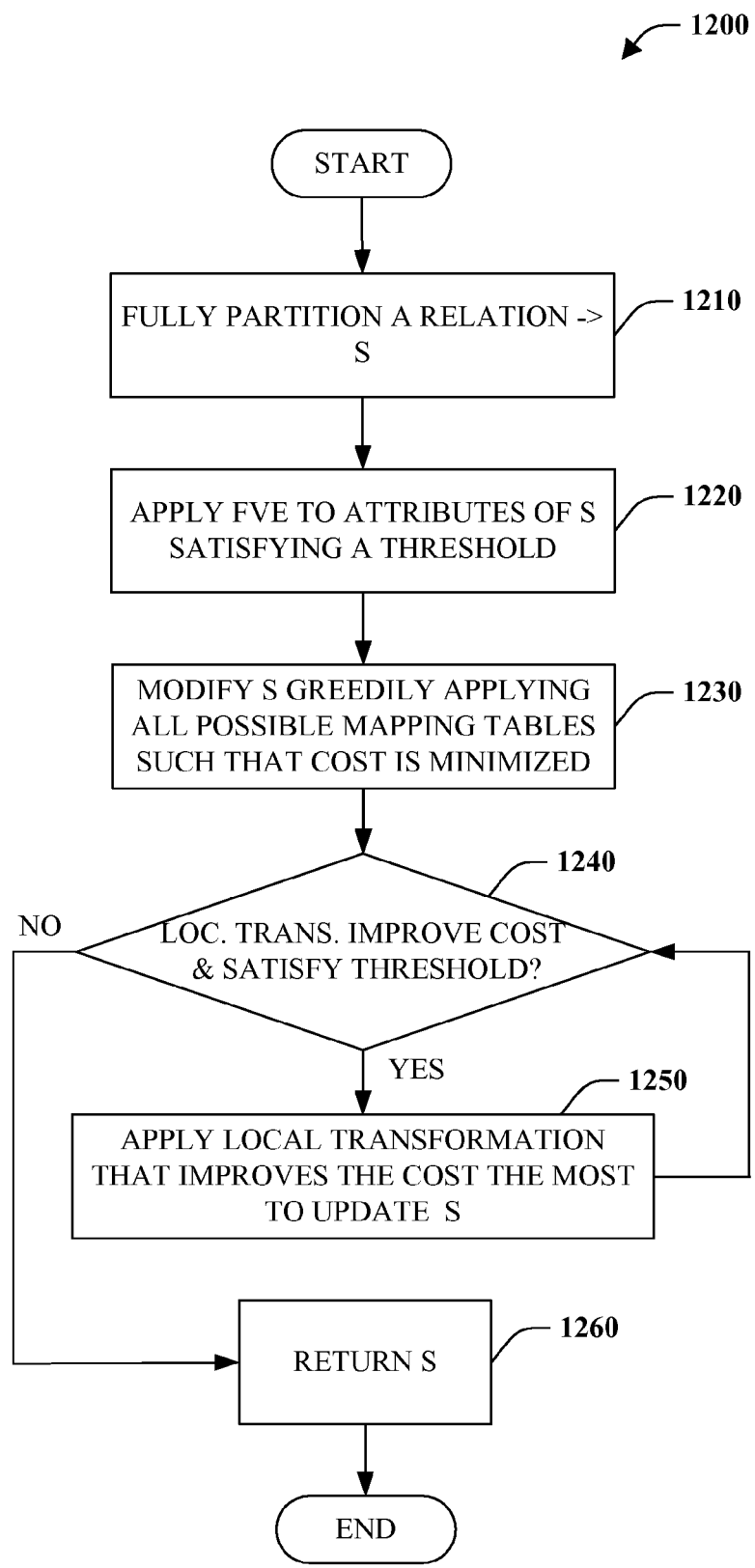
FIG. 12 is a flow chart diagram of a method of integrated schema transformation.

Referring to FIG. 12, an integrated schema transformation method 1200 is depicted in accordance with an aspect of the subject innovation. At reference numeral 1210, the schema is fully partitioned. At 1220, frequent value elimination is applied to every attribute of the schema meeting the threshold of 0.5. This schema is called S. At numeral 1230, schema S is modified greedily by applying all possible mapping table transformations such that cost is minimized. Subsequently or concurrently, a determination is made at 1240 as to whether a local transformation to the schema can improve the cost (i.e., minimize) and satisfy the threshold (invariant should holds after every local transformation). Local transformations can include but are not limited to merging two existing vertical partitions in S, mapping or unmapping an attribute, applying or removing frequent value elimination on an attribute, moving an attribute from one partition to another, moving an attribute out of one partition to create a new partition and moving attributes between partitions. If it is determined at 1240 that a local transformation can improve cost and satisfies the threshold, then the method proceeds to 1250. At reference numeral 1250, the local transformation that improves cost the most is applied to the schema S, thereby updating S. The method then loops back to numeral 1240 until all local transformations that obey the threshold are applied at which point the schema is returned as noted at reference numeral 1260. Alternatively, if no local transformation exists that will improve cost as determined at 1240 then the method can simply continue at 1260 where the schema is returned.

Method 1200 is an extension of the individual algorithms. Note that unmapping of attributes is a local transformation. This is significant as it is possible that an attribute initially gives large gains on mapping, but as it is partitioned, the join cost offsets the benefit of the mapping. In such situations, unmapping attributes could give local improvements. Similarly, removing FVE from attributes is also considered at the local stage.

Like the methods for each of the individual transformations, an approximation guarantee is obtained for method 1200 under the simplified cost model where the cost of evaluating a query is given by a linear combination of the relevant relation sizes. In particular, method 1200 gives a (k+O(1)) approximation of the optimal cost, where k is the maximum number of attributes that can be grouped in any mapping table.

Note that an i-attribute mapping table is likely to be useful only if a set of i attributes are highly correlated with each other. Additionally, if the maximum number of correlated attributes is small, a constant factor approximation results.

It should also be appreciated that method 1200 as well as the others (900, 1000 and 1100 of FIGS. 9, 10 and 11, respectively) can be further tuned by adding and/or utilizing heuristics, machine learning, rule based logic, and statistics, among other things. Accordingly, the provided methods need not be utilized exactly as described, but as a basic framework upon which further tuning can be built.

As used herein, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
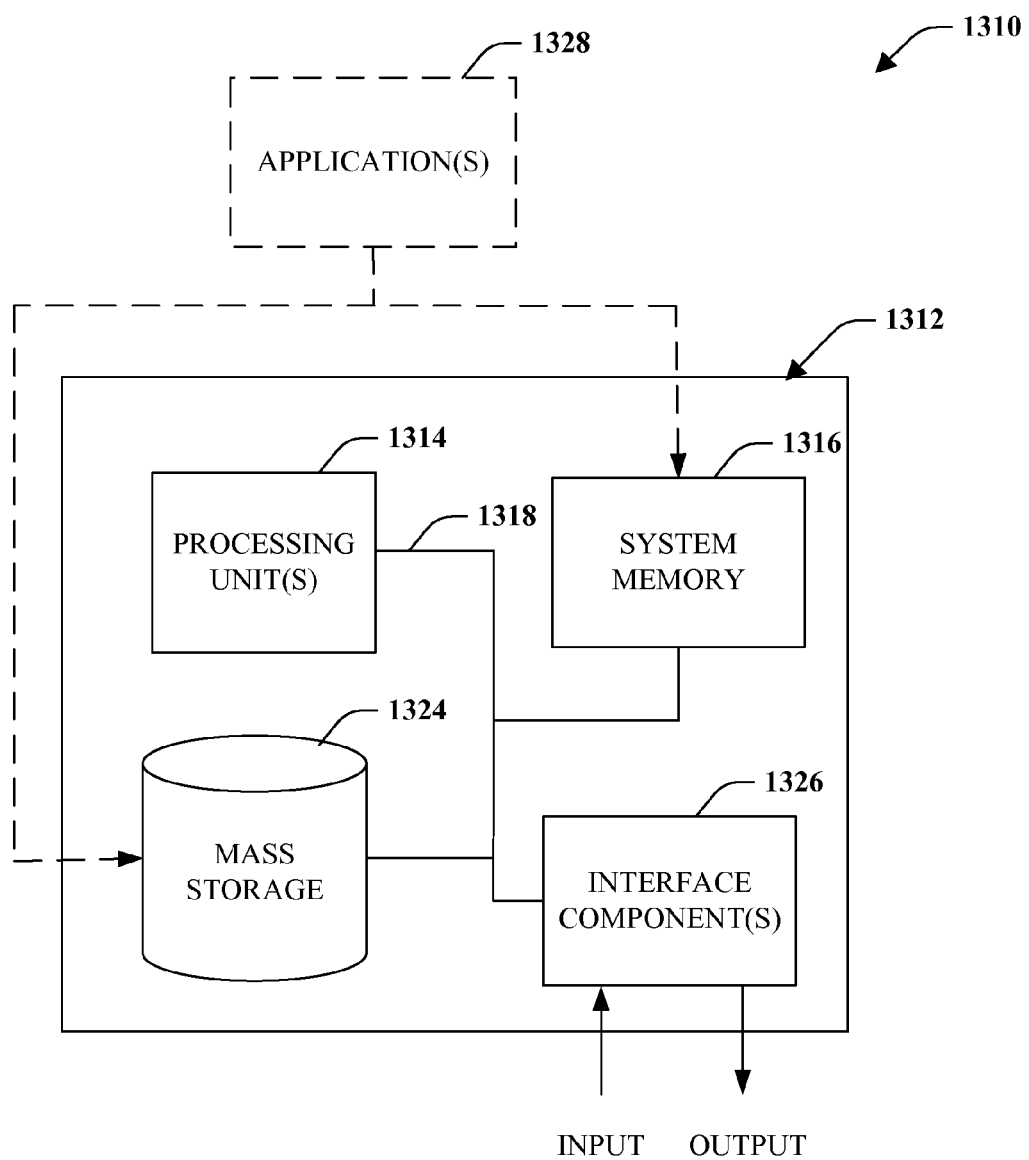
FIG. 13 is a schematic block diagram illustrating a suitable operating environment for aspects of the subject innovation.
Figure 14:
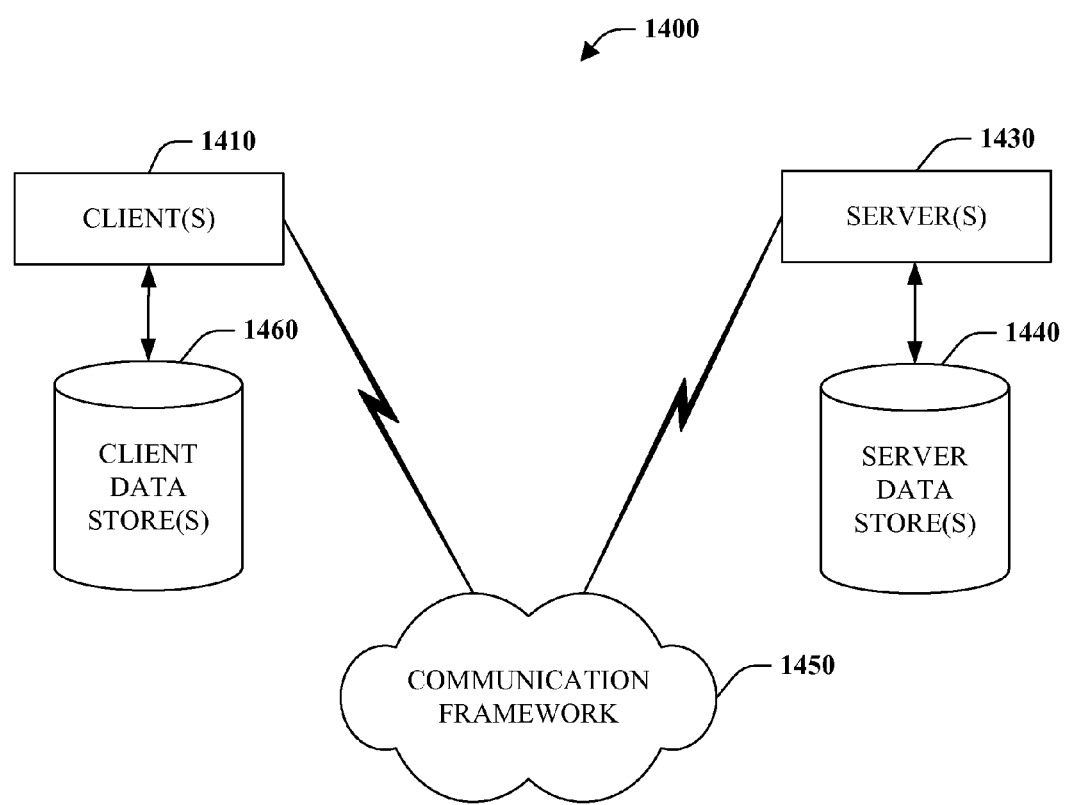
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g. personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g. CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A database design tuning system comprising the following computer-implemented components:
    at least one processor that executes the following computer executable components stored on a computer readable medium;
    an interface component that acquires a database schema; and
    a logical tuner component that automatically employs one or more schema transformations to optimize the database schema for performance with respect to a workload, wherein the logical tuner component identifies the one or more schema transformations that minimize workload evaluation cost, and are reversible, non-redundant and normalization preserving, the one or more schema transformations comprising a mapping table transformation that maps wide attributes with small domains to respective narrower attributes in at least one table, wherein the narrower attributes and associated mapping utilize less bytes of data than the wide attributes to facilitate reduction in width of the at least one table and the bytes of data utilized, the respective narrower attributes comprising respective integer values, and respective data values of the wide attributes are replaced with the respective integer values in the at least one table as part of the mapping, wherein the respective integer values are respectively associated with the respective data values of the wide attributes in the mapping, and wherein a query is automatically rewritten in accordance with the mapping, and wherein the one or more schema transformations further comprising a schema transformation that partitions out one or more columns from a table including frequent values, removes the frequent values from the one or more partitioned columns and stores the frequent values separately to exploit data distribution skew.

2. The system of claim 1, the cost is one of a value proportional to a linear combination of the sizes of all relations that are to be accessed, or query optimizer-estimated cost.

3. The system of claim 1, further comprising:
    an analysis component that employs a simplified cost model to facilitate analysis and identification of the one or more schema transformations to optimize the database schema for performance with respect to the workload, wherein the simplified cost model is constructed with a specification that cost of evaluating a query associated with the workload is proportional to linear combination of sizes of all relations to be accessed.

4. The system of claim 1, the one or more schema transformations comprising a schema transformation that partitions a set of one or more typically accessed attributes into another table.

5. The system of claim 1, the one or more schema transformations comprising a schema transformation that alters an attribute data type to reduce table size.

6. The system of claim 1, the one or more schema transformations comprising a schema transformation that adds one or more computed columns to the schema.

7. The system of claim 1, the logical tuner component interacts with a physical design tuner component to optimize database performance.

8. The system of claim 1, the logical tuner component selectively applies two or more transformations comprising two or more of a vertical partitioning transformation, a mapping table transformation, or a frequent value elimination transformation to minimize workload execution cost.

9. A method of logical schema tuning comprising:
    employing at least one processor executing computer executable instructions stored on a computer readable storage medium to implement the following acts:
    acquiring a database schema associated with a database;
    identifying one or more schema transformations that reduce cost with respect to a workload in relation to the database using an integrated technique that results in optimally identifying and applying the one or more schema transformations, wherein the one or more schema transformations are reversible, non-redundant and normalization preserving, comprising:
        identifying one or more attribute values in the database schema that meet a predefined frequency threshold to facilitate performing frequency value elimination to partition out columns in the database schema containing frequent attribute values;
        partitioning out one or more columns of the database schema that contain the one or more identified attribute values;
        removing the identified attribute values from the one or more partitioned columns;
        storing the identified attribute values separately to exploit data distribution skew;
        applying available mapping table transformations to greedily modify the database schema, wherein applying the available mapping table transformations minimizes cost with respect to a workload, wherein the available mapping table transformations map wide attributes with small domains to respective narrower attributes in at least one table, wherein the narrower attributes and associated mapping utilize less bytes of data than the wide attributes to facilitate reducing width of the at least one table and the bytes of data utilized, the respective narrower attributes comprising respective integer values, and respective data values of the wide attributes are replaced with the respective integer values in the at least one table as part of the mapping, wherein the respective integer values are respectively associated with the respective data values of the wide attributes in the mapping, and wherein a query is automatically rewritten in accordance with the mapping; and
        determining whether one or more local transformations that, when applied to the database schema, will minimize the cost and satisfy an invariant threshold that, when met, indicates an invariant holds after the one or more local transformations.

10. The method of claim 9, further comprising applying the one or more local transformations to the database schema to update the database schema when the one or more local transformations minimize the cost and at least meet the invariant threshold, the one or more local transformations comprising one or more of mapping an attribute associated with the database schema, unmapping an attribute associated with the database schema, applying frequent value elimination on an attribute associated with the database schema, removing frequent value elimination on an attribute associated with the database schema, moving an attribute from one partition of the database schema to another partition of the database schema, or moving an attribute out of one partition of the database schema to a newly created partition.

11. The method of claim 10, comprising:
identifying a set of mapping tables that satisfy a storage constraint; and
determining a set of one or more non-conflicting mapping tables application of which reduces cost with respect to the workload.

12. The method of claim 11, further comprising performing one or more local improvements on the database schema including at least one of merging one or more of the one or more non-conflicting mapping tables or splitting a multi-attribute mapping table.

13. The method of claim 10, comprising:
determining one or more frequent attribute values to be separated from other data associated with the database based at least in part on the predefined frequency threshold;
partitioning out the one or more columns in the database schema that include the one or more identified attribute values which are the one or more frequent attribute values; and
storing the one or more frequent attribute values of the one or more columns as metadata in a separate structure from the other data.

14. The method of claim 13, further comprising performing one or more local improvements including at least one of merging column groups, moving an attribute from one column group to another column group, or moving an attribute out of one column group and creating a new single column that is a frequent value eliminated column.

15. The method of claim 10, comprising fully partitioning a schema and applying local transformations that improve cost most progressively until no local transformation exists that improves cost most.

16. The method of claim 10, comprising:
partitioning the schema with frequent value elimination applied to attributes meeting a threshold;
modifying the partitioned schema by applying mapping table transformations that minimize cost; and
applying local transformations that improve the cost most iteratively until no local transformation exists that improves the cost most.

17. A logical database tuning system comprising:
at least one processor;
means for receiving the database schema; and
means for recommending one or more logical schema transformations that optimize database performance based for a workload, wherein the means for recommending one or more logical schema transformations identifies the one or more logical schema transformations that minimize workload evaluation cost, and are reversible, non-redundant and normalization preserving, the one or more logical schema transformations comprising a mapping table transformation that maps wide attributes with small domains to respective narrow attributes in a table associated with the database, wherein the narrow attributes and associated mapping utilize less bytes of data than the wide attributes to facilitate reducing width of the table and the bytes of data utilized in the database, the respective narrow attributes comprising respective narrow values, and, as part of the mapping, respective data values of the wide attributes are replaced with the respective narrow values in the table, and wherein a query is automatically rewritten in accordance with the mapping, and wherein the one or more logical schema transformations further comprising a logical schema transformation that partitions out one or more columns from a table including frequent values, removes the frequent values from the one or more partitioned columns and stores the values separately to exploit data distribution skew.

* * * * *